2 Sheets--Sheet 1.

JAMES J. RUSS

Improvement in Planing Machines.

No. 4,737. Reissued Feb. 6, 1872.

Witnesses

Chas. S. Pudleigh

Thos. H. Dodge

Inventor

James J. Russ

AM. PHOTO-LITHOGRAPHIC CO. N.Y. (OSBORNE'S PROCESS.)

JAMES J. RUSS

2 Sheets--Sheet 2.

Improvement in Planing Machines.

No. 4,737.

Reissued Feb. 6, 1872.

Witnesses

Chas. S. Burleigh

Thos. H. Dodge

Inventor:

James J. Russ

AM. PHOTO-LITHOGRAPHIC CO. N.Y. (OSBORNE'S PROCESS.)

UNITED STATES PATENT OFFICE.

JAMES J. RUSS, OF WORCESTER, MASS., ASSIGNOR TO R. BALL & CO.

IMPROVEMENT IN PLANING-MACHINES.

Specification forming part of Letters Patent No. 75,984, dated March 24, 1868; reissue No, 4,737, dated February 6, 1872.

*To all whom it may concern:*

Be it known that I, JAMES J. RUSS, of the city and county of Worcester and Commonwealth of Massachusetts, have invented certain new and useful Improvements in Wood-Planing and Molding Machines; and I do hereby declare the following to be a full, clear, and exact description of the same, reference being had to the accompanying drawing which forms a part of this specification, and in which—

Figure 1:
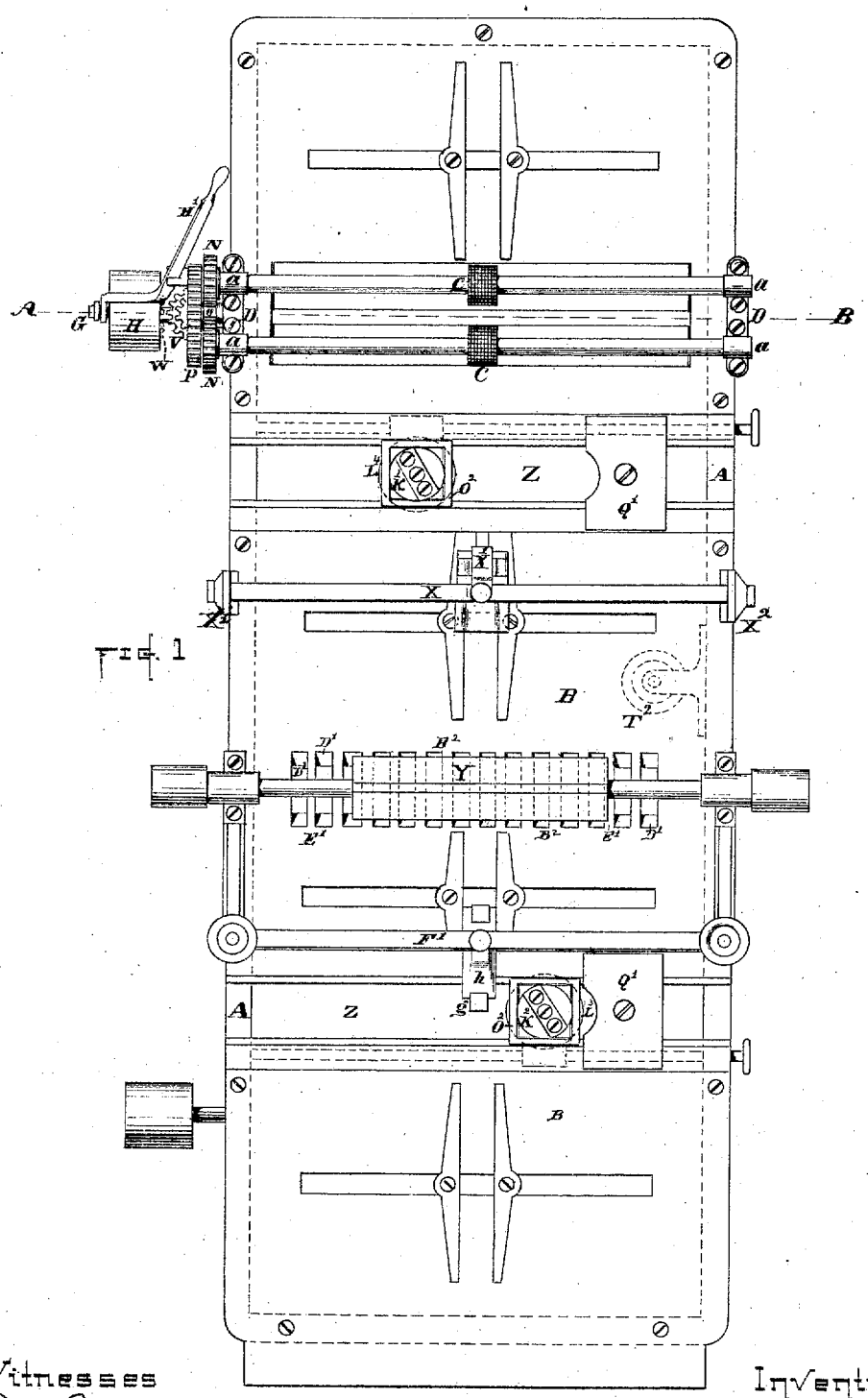
Figure 4:
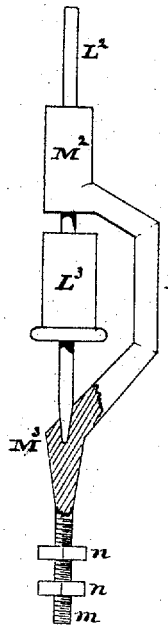
Figure 5:
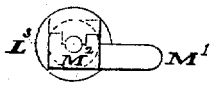
Figure 2:
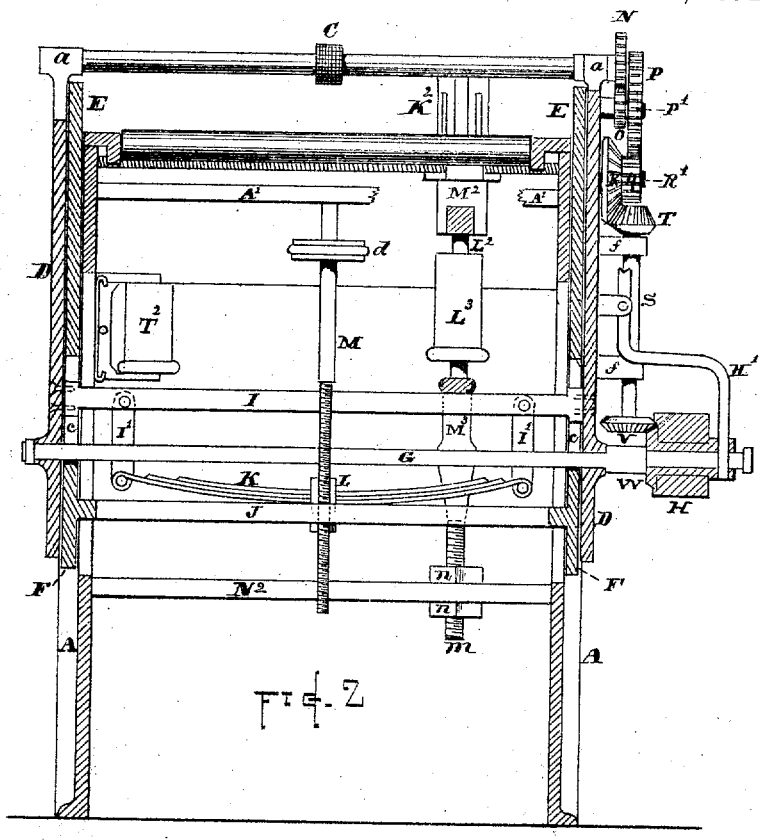
Figure 3:
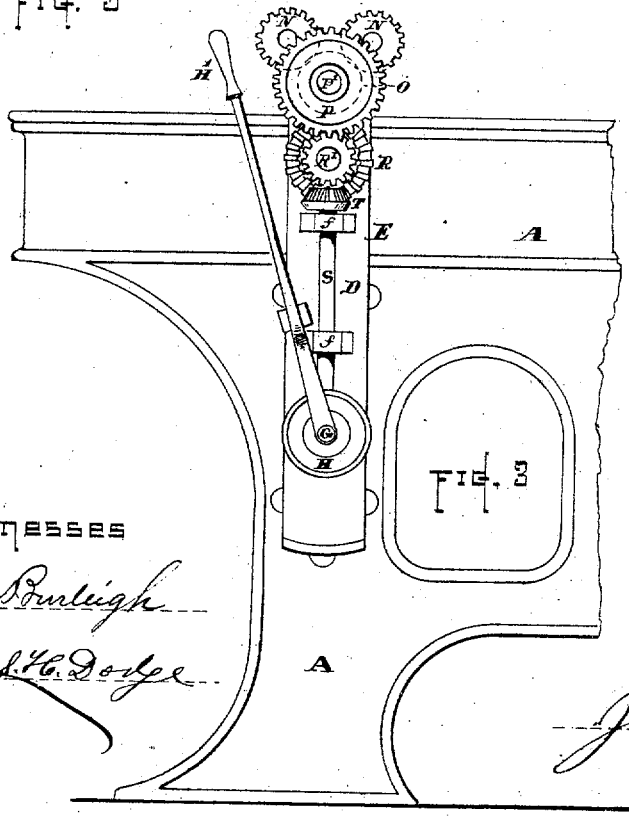
Figure 6:
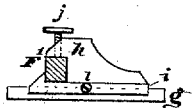
Figure 7:
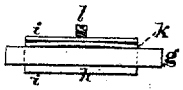

Figure 1 represents a plan or top view of a molding-machine having my improvements applied thereto. Fig. 2 represents a transverse vertical section of the machine at its end where the feed-rollers are located. Fig. 3 represents a side elevation of one end of the machine. Figs. 4 and 5 represent detail views of one of the brackets for supporting the vertical cutter-head spindles, and Figs. 6 and 7 represent detail views of one of the presser-blocks.

The nature of my invention consists in certain improvements in wood-planing machines, as hereafter described. The supporting framework of my improved molding-machine consists of two upright side pieces, marked A in the drawing, which at suitable points are joined together by horizontal brace-rods or bars, and at their upper part by the bed-plate B, over which the "stuff" or wood passes to be acted upon by the cutter, whereby it is cut into form or molded. C C indicate feed-rolls, supported at each end in bearings *a* on the upper ends of vertical side pieces D of the feed-roll adjusting-frame E, composed of side pieces or plates D and F, together with their connections, the construction of which will be now described, as well as its combination with the main frame A, and also the driving mechanism for operating the feed-rolls C. The side pieces D of the feed-roll adjusting-frame E are each provided with a dovetailed strip fixed to their inside faces. These are arranged to move in corresponding-shaped grooves formed in the plates F, which latter are in turn arranged to move in suitable ways or grooves formed upon the outside faces of the main frame A. Beneath the bed B, and supported in suitable bearings in the lower part of the side pieces D, is a horizontal shaft, G, extending from side to side of the machine, and provided at one of its ends, which projects some distance beyond the frame, with a pulley, H, on which runs the belt for driving the feeding devices, as hereinafter described. The shaft G passes through vertical slots *c*, formed for that purpose through the inner plates F. I indicates a horizontal bar, extending across from one to the other of the outside plates D D, passing through the slots *c* in the inner plates F, and having its ends rigidly secured to the outer plates D, thereby connecting said plates to each other. J indicates a similar horizontal bar, arranged below the bar I and connecting the inner plates F, to which its ends are rigidly secured. K indicates a spring, which is secured at its center to the upper side of the cross-bar J, while its ends are joined to the cross-bar I by means of downward-projecting pieces or links I′, as illustrated in Fig. 2. The spring K is fastened to the bar J by means of a screw-loop, L, the upper looped part of which embraces the spring K, while the lower part thereof is passed through the bar J and provided with a nut, which is turned up against the bar to clamp the parts in position. A screw-spindle, M, provided with a milled flange or hand-wheel, *d*, for turning it, is arranged in a vertical position through the bar J, which latter is fitted with a female screw-thread to engage the thread on the screw-spindle M. The end of the screw-spindle M is arranged and secured in a suitable opening in a cross-bar, A′, which extends from side to side of the frame A, beneath the bed B, said spindle M being allowed to turn freely in the opening, while it is by means of the bar supported in position. By turning the spindle M the cross-bar J and feed-roll supporting-frame, together with the feed-rolls C, can be raised or depressed to adjust the feed-rolls C to the thickness of the "stuff" to be molded or operated upon. By arranging the side plates D and F of the adjusting frame E to slide one upon the other in connection with the spring K, the pressure or feed-rolls C are permitted to yield to any slight variations or inequalities in the thickness of the material passing under them. The feed-rolls C are provided at one end with similar-sized spur-pinions N, both of which mesh into a spur-pinion, O, whereby the pinions N are revolved, causing the rolls C to both turn in the same direction. The pinion O is attached to the inner side of a spur-gear, P, and both are supported and turn together upon a center stud, P′, projecting from the upper part of one of the plates D. The gear P meshes into a pinion, Q, fixed to the front side of a bevel-gear, R, which latter two are supported upon a stud, R′, that projects from the plate D at a short distance below the stud P′. A vertical shaft, S, is supported in suitable bearings *f f* on the outer side of the plate D, below the studs P′ and R′, and said shaft S is provided with bevel-pinions T V at its ends, the upper one, T, to mesh with the gear R, and the lower one, V, to mesh with a similar pinion, W, fixed to the end of the pulley H, as shown in Fig. 2. The pulley H is arranged to slide upon its shaft G, and can be moved back and forth by a hand-lever, H′, to throw the pinion W into and out of gear with the pinion V when desired. When said pinions V and W are in gear the motion which is imparted to the pulley H by the driving-belt is transmitted to the feed-roller C through the train of gears and pinions above described. X indicates a bar for supporting and carrying the presser-shoe $X^1$, used just in front of the cutter-head for firmly holding the "stuff" to the bed while it is being operated upon by the molding-cutters. This presser-shoe or foot $X^1$ is the presser-foot embraced in and secured by Letters Patent granted to me the 14th day of August, A. D. 1866, and therefore need not be more fully described herein. The ends of the bar X are secured to vertical plates $X^2$, which are connected to inside plates and other parts which are constructed and arranged in a similar manner to those described for supporting and adjusting the feed-rolls C, and for a similar purpose—viz., to support and adjust the bar X and presser-shoe $X^1$, and at the same time to permit said shoe $X^1$ to yield to the variation of thickness in the "stuff" as it passes beneath. That portion $B^2$ of the bed B over which the cutter-head Y is arranged to operate is provided with a series of slots or openings, D′, extending parallel with the direction in which the "stuff" moves, and also with the sides of the machine. The openings are separated by short bridge-bars E′, as illustrated in Fig. 1. By this construction of the bed the cutters upon the cutter-head Y are allowed to operate upon and perfectly mold or cut the lower edges of the stuff without striking the bed, and thus becoming injured, from the fact that the cutter can be arranged upon the head Y in such a manner that the openings D′ will receive their ends as the head revolves, thus permitting them to pass below the upper surface of the bed, while at the same time the bridge-bars E′ give a firm and ample support to the stuff. F′ indicates a presser-bar, carrying a presser-block, *g*, which block is arranged to bear upon the "stuff" after it has been worked out by the molding cutter-head. The block *g* is secured in a holder, *h*, between flanges *i*, upon its under side, by the action of a bent spring, *k*, which bears against the ends of the block *g* and presses it against the opposite flange *i*, as shown in Figs. 6 and 7. The pressure of the spring can be adjusted by turning in the set-screw *l* at the side of the holder *h*. The holder *h* is clamped in any position upon the bar F′ by means of the set-screw *j*, arranged in the upper part thereof, as indicated. $K^1 K^2$ indicate the upright cutter-heads, for working the sides of "stuff" as it passes through the machine. These heads are arranged, respectively, at the right and left sides of the machine, and are supported upon the upper ends of the vertical spindles $L^2$. Each of these vertical cutter-head spindles $L^2$ are provided with a similar supporting-bracket, $M^1$, detailed views of which are given in Figs. 4 and 5. The upper portion of the bracket is provided with a box-bearing, $M^2$, in which the spindle $L^2$ turns, and near its lower part with a socket-bearing, $M^3$, in which the foot of the spindle is retained, while the central portion of the bracket, which connects the upper and lower bearings $M^2$ $M^3$, and is cast in the same piece therewith, is curved outward to allow sufficient space for the pulley $L^3$, which is arranged upon the spindle $L^2$, between the bearings $M^2$ $M^3$, as indicated. The lower extremity of the bracket terminates with a screw-spindle, *m*, and is provided with two nuts, *n n*, which are screwed up, one above and one below, against the slotted cross-bar $N^2$, at the lower part of the frame A, for holding the lower portion of the bracket $M^1$ in position, while they also assist in its adjustment. The bearing $M^2$, or upper end of the bracket $M^1$, is inclosed and supported in a box-slide, $O^2$, arranged to move in a transverse opening, Z, across the bed-plate B, by which arrangement the side cutter-heads can be adjusted in position laterally, while by properly turning the nuts *n* the brackets which support the heads can be raised or lowered to adjust the heads vertically. When the heads are adjusted vertically the bearing $M^2$ moves up or down within the slide-box $O^2$, the bearings $M^2$ $M^3$ and cutter-spindle $L^2$ always remaining in the same relative positions as regards each other, so that the box $M^2$ is always bearing upon the same part of the spindle, and also when the cutter-head is adjusted at a considerable height above the bed B. The bearing $M^2$ supports the head and prevents any vibration or jar of the spindle and head. Bridge-plates Q′ are provided for the openings Z, that can be moved either to the right or left for lateral adjustment independently of the cutter-head bearings, and thus furnish a support for the "stuff" as it passes through the machine. When it is not desirable to use the bridge-plates beneath the stuff they can be placed at the opposite sides of the cutter-heads, as indicated in Fig. 1, at the head $K^2$; the plates will then be out of the way of the "stuff" and still not be liable to become lost from the machine. $T^2$ indicates a loose pulley, arranged at one side of the machine in a vertical position, at the inner side of the main frame A. This pulley serves for guiding the belt by which the upright cutter-heads are driven, so that both cutter-heads can be operated in the proper directions by a single belt from a counter or other driving-shaft arranged at the rear end of the machine. The belt extends from the pulley of the counter-shaft to and around the loose pulley $T^2$; from thence back to and around the pulley $L^3$ of the cutter-head $K^2$; thence forward to and around the pulley $L^4$ of the cutter-head $K^1$, and then back to the pulley on the counter-shaft.

Having described my improvements in wood-planing and molding machines, what I claim therein as new and of my invention, and desire to have secured by Letters Patent, is—

1. The combination, with the main frame A in a molding-machine, of the adjustable feed-roller frame E, provided with bars I J and spring K, and screw L and links I′, substantially as and for the purpose described.

2. The bracket or frame M′ for supporting the spindle of the vertical cutter-head, substantially as shown and described.

3. The combination, with the main frame A in a molding-machine, of the adjustable frames for supporting the spindles of the vertical cutter-heads $K^1$ $K^2$, constructed and arranged for adjusting the cutter-heads vertically, substantially as and for the purpose set forth.

4. The combination of the presser-shoe X′, bar X upon which it is arranged, and the adjustable frame upon which the shoe and bar are supported, with the machine, for the various adjustments thereon, in the manner substantially as shown and described, and for the purposes set forth.

5. The clamp-holder *h* for the presser-block, provided with a spring, arranged for operation substantially as and for the purposes set forth.

6. The bridge-plates Q′, arranged for use in the machine as and for the purpose set forth.

JAMES J. RUSS.

Witnesses:
CHAS. H. BURLEIGH,
THOS. H. DODGE.